(12) United States Patent
Delplace et al.

(10) Patent No.: US 11,756,590 B2
(45) Date of Patent: Sep. 12, 2023

(54) METHOD OF DECODING AN INCOMING AUDIO/VIDEO STREAM

(71) Applicant: SAGEMCOM BROADBAND SAS, Malmaison (FR)

(72) Inventors: Stéphane Delplace, Malmaison (FR); Frédéric Sodi, Malmaison (FR); Jérôme Berger, Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 100 days.

(21) Appl. No.: 17/011,224

(22) Filed: Sep. 3, 2020

(65) Prior Publication Data

US 2021/0065749 A1 Mar. 4, 2021

(30) Foreign Application Priority Data

Sep. 4, 2019 (FR) ...................................... 1909729

(51) Int. Cl.
*G11B 27/10* (2006.01)
*H04N 19/44* (2014.01)
(Continued)

(52) U.S. Cl.
CPC .............. *G11B 27/10* (2013.01); *G11B 27/36* (2013.01); *H04N 5/06* (2013.01); *H04N 19/44* (2014.11); *H04N 19/68* (2014.11)

(58) Field of Classification Search
CPC ........ G11B 27/10; G11B 27/36; H04N 19/44; H04N 19/68; H04N 5/06
See application file for complete search history.

(56) References Cited

U.S. PATENT DOCUMENTS

| 10,694,240 B2* | 6/2020 | Quere .................. H04N 21/439 |
| 2015/0067186 A1* | 3/2015 | Kuhn ............... H04N 21/23406 |
| | | 709/231 |
| 2018/0288499 A1 | 10/2018 | Niemeyer et al. |

FOREIGN PATENT DOCUMENTS

| EP | 3113498 A1 | 1/2017 |
| EP | 3209016 A1 | 8/2017 |

OTHER PUBLICATIONS

ETSI TS 103 286-2 V1.2.1 (Aug. 2017) "Digital Video Broadcasting (DVB); Companion Screens and Streams; Part 2: Content Identification and Media Synchronization," ETSI Technical Specification, European Telecommunications Standards Institute, Sophia-Antipolis, France, Aug. 3, 2017, pp. 1-174 (XP-014301550)—https://www.etsi.org/deliver/etsi_ts/103200_103299/10328602/01.02.01_60/ts_10328602v010201p.pdf.

* cited by examiner

*Primary Examiner* — Mishawn N. Hunter
(74) *Attorney, Agent, or Firm* — Muncy, Geissler, Olds & Lowe, P.C

(57) ABSTRACT

A method of decoding an incoming audio/video stream received by a decoder box that is connected to audio playback equipment and to video playback equipment, the method comprising the steps of evaluating an audio latency and a video latency; if the audio (or respectively video) latency is greater than the video (or resp. audio) latency, testing a first condition to ensure that the time difference ($\Delta t\_a$, $\Delta t\_v$) between the presentation time stamp of the audio (or resp. video) samples and the reference clock signal is sufficient, and if the first condition is satisfied, acting, when decoding the audio (or resp. video), to decrease the presentation time stamp of the audio (or resp. video) samples in order to advance playback of the audio (or resp. video) samples, thereby compensating at least in part the latency (Continued)

difference between the audio (or resp. video) latency and the video (or resp. audio) latency.

9 Claims, 3 Drawing Sheets

(51) Int. Cl.
*H04N 19/68* (2014.01)
*G11B 27/36* (2006.01)
*H04N 5/06* (2006.01)

METHOD OF DECODING AN INCOMING AUDIO/VIDEO STREAM

The invention relates to the field of decoder boxes and of decoding incoming audio/video streams.

BACKGROUND OF THE INVENTION

A decoder box (commonly referred to as a "set-top box") that operates in compliance with the ISO/IEC 13818-1 standard receives an incoming audio/video stream, decodes the incoming audio/video stream, and synchronizes it prior to playing it back.

The incoming audio/video stream may be transmitted to the decoder box by cable, by satellite, or indeed over an Internet protocol (IP) link (e.g. a DASH-TS or HLS-TS link).

The incoming audio/video stream comprises audio samples and video samples that are multiplexed. The samples are time-stamped by respective presentation time stamps (PTS). The presentation time stamp defines the time at which the sample is to be rendered (played for the audio, displayed for the video).

The incoming audio/video stream transports a reference clock signal known as the program clock reference (PCR). The decoder box makes use of the reference clock signal to servocontrol its internal clock (known as the system time clock (STC)) and to display the samples correctly.

The video is then generally displayed on a television.

As for the audio, it may be played either by the television, or by an audio/video amplifier (e.g. connected to an HDMI port or to an S/PDIF port of the decoder box), or by some other audio playback equipment connected directly to the decoder box via the HDMI port or the S/PDIF port, or else by wireless transmission of the Wi-Fi or Bluetooth type. By way of example, the audio playback equipment may be a sound bar or a smart loudspeaker.

Such equipment introduces latency that results in particular from the internal processing times of the various pieces of equipment. This latency may be evaluated in various ways. By way of example, the latency may be supplied directly by the equipment itself, by transmitting extended display identification data (EDID) via the HDMI port. Also by way of example, the latency may be evaluated by measuring an offset between transmitting and receiving a sound signal.

If the audio and the video are not rendered by the same piece of equipment, the audio latency of the audio path and the video latency of the video path need to be equal in order to avoid introducing any user-perceivable offset between the sound and the image. By way of example, such an offset can give rise to a problem of lip synchronization.

The above is illustrated with reference to accompanying FIG. 1, which shows a decoder box 1 that is connected to a loudspeaker 2 and to a television 3.

The decoder box 1 includes an audio decoder module 4 and an audio capture module 5. The audio path comprises the audio decoder module 4, audio capture module 5, and loudspeaker 2.

The decoder box 1 also includes a video decoder module 6. The video path comprises the video decoder module 6 and the television 3.

The decoder box 1 also includes a synchronization mechanism 7 for synchronizing the audio samples and the video samples relative to the reference clock signal.

In the example of FIG. 1, it is assumed that the loudspeaker 2 introduces a latency of 90 milliseconds (ms) in the audio path. The audio capture module 5 introduces a latency of 80 ms in the audio path. The total audio latency is thus 170 ms.

The television 3 introduces a latency of 70 ms in the video path. The total video latency is thus 70 ms.

The audio latency is thus 100 ms greater than the video latency: a delay is therefore needed in the video path.

With reference to accompanying FIG. 2, once again the loudspeaker 2 introduces a latency of 90 ms in the audio path. The audio capture module 5 introduces a latency of 80 ms in the audio path. The total audio latency is thus 170 ms.

This time, the television 3 introduces a latency of 190 ms in the video path. The total video latency is thus 190 ms.

The video latency is thus 20 ms greater than the audio latency: a delay is therefore needed in the audio path.

In both situations, these delays are introduced in the paths by the synchronization mechanism 7 applying a "decoding delay" that delays the decoding of the sound or of the images. The decoding delay is positive and corresponds to an "offset" that is introduced in the audio path or in the video path.

In the example of FIG. 1, the video decoding delay is equal to 100 ms, and in the example of FIG. 2, the audio decoding delay is equal to 20 ms.

Introducing a decoding delay in the audio path or in the video path has a negative impact on user experience.

Specifically, the decoding delay is applied to every user action on the incoming audio/video stream. Thus, by way of example, the time taken for "channel-hopping" (i.e. the time needed to change television channel) is increased by the decoding delay. The channel-hopping time may thus typically be increased by 100 ms to 200 ms depending on the audio playback equipment used, for a total channel-hopping time that is of the order of 800 ms in the best of circumstances. The effect of the decoding delay is thus far from being negligible.

Object of the Invention

An object of the invention is to improve user experience of a decoder box, and to do so in a manner that is simple and inexpensive.

SUMMARY OF THE INVENTION

In order to achieve this object, there is provided a decoding method for decoding an incoming audio/video stream received by a decoder box that is connected to audio playback equipment and to video playback equipment, the incoming audio/video stream transporting a reference clock signal and including audio samples and video samples including respective presentation time stamps, the decoding method comprising the steps of:

evaluating the audio latency introduced by an audio path and the video latency introduced by a video path;

if the audio (or respectively video) latency is greater than the video (or resp. audio) latency, testing a first condition to ensure that the time difference between the presentation time stamp of the audio (or resp. video) samples and the reference clock signal is sufficient to enable the audio (or resp. video) samples to be decoded correctly, and if the first condition is satisfied, acting, when decoding the audio (or resp. video), to decrease the presentation time stamp of the audio (or resp. video) samples in order to advance playback of the audio (or resp. video) samples, thereby compensating at least in part the latency difference between the audio (or resp. video) latency and the video (or resp. audio) latency.

Thus, in the decoding method of the invention, the latency difference is compensated not by systematically adding an offset in the audio path or in the video path, but by taking advantage of the time difference between the PTS and the PCR (if it is sufficient) in order to advance playback of the pertinent (audio or video) samples. The user is thus not subjected to the effect of a systematic offset, and user experience is thus improved considerably.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
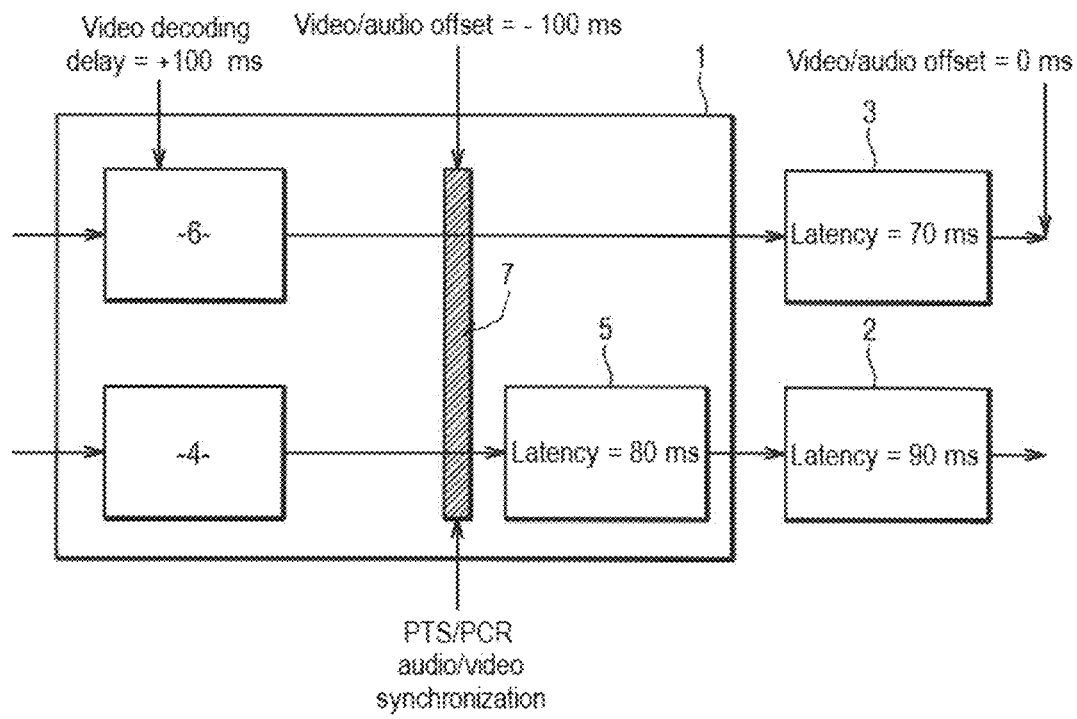
FIG. 1 shows a prior art decoder box, a loudspeaker, and a television, the audio latency of the audio path being greater than the video latency of the video path.
Figure 2:
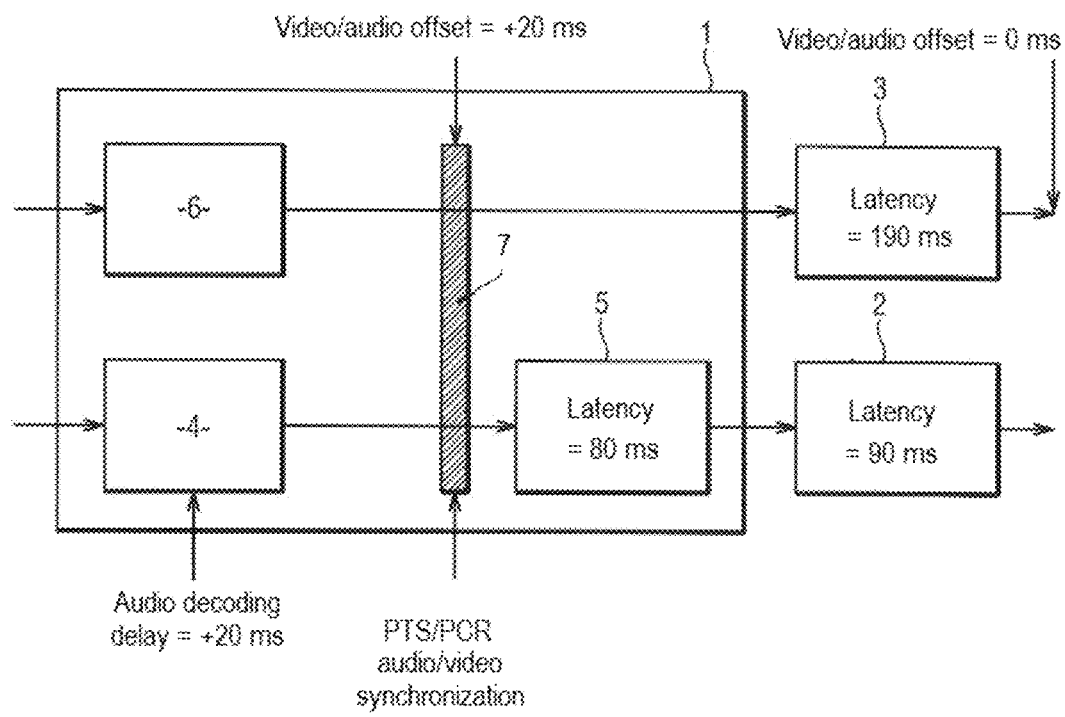
FIG. 2 is a figure similar to FIG. 1, the video latency being greater than the audio latency.
Figure 3:
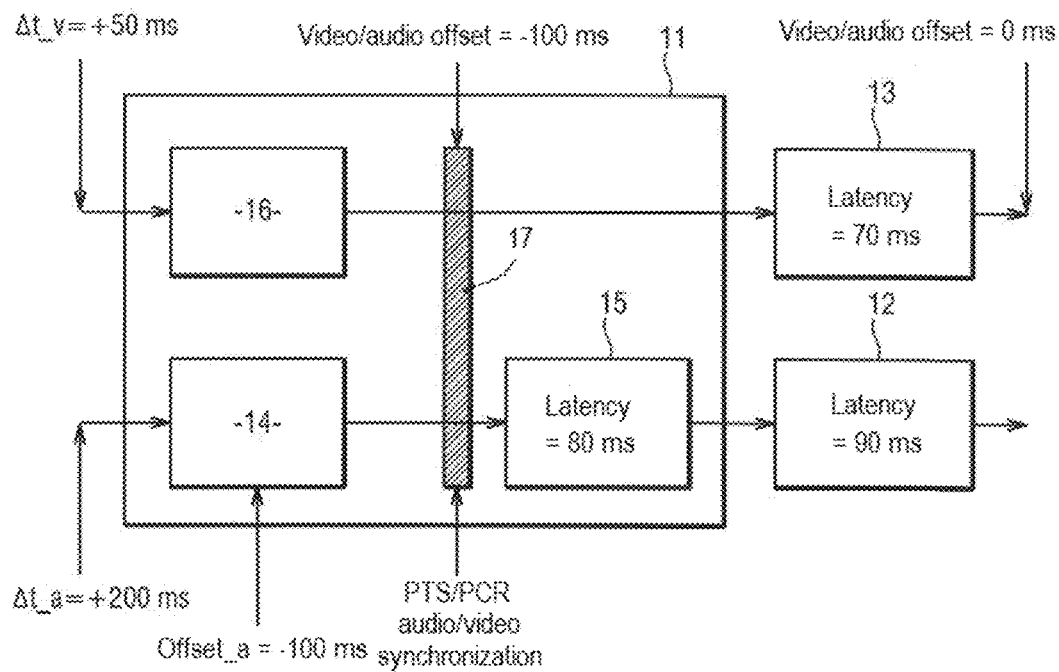
FIG. 3 shows a decoder box in which the decoding method of the invention is performed, a loudspeaker, and a television, the audio latency being greater than the video latency.

With reference to FIG. 3, the decoding method of the invention is performed in a decoder box 11 that is connected to audio playback equipment, specifically a loudspeaker 12, and to video playback equipment, specifically a television 13.

The decoder box 11 receives an incoming audio/video stream transporting a reference clock signal and including audio samples and video samples, the samples having respective presentation time stamps.

The decoder box 11 includes an audio decoder module 14 and an audio capture module 15. The audio path comprises the audio decoder module 14, audio capture module 15, and loudspeaker 12.

The decoder box 11 also includes a video decoder module 16. The video path comprises the video decoder module 16 and the television 13.

The decoder box 11 also includes a synchronization mechanism 17 for synchronizing both the audio samples and the video samples relative to the reference clock signal.

In the example of FIG. 3, it is assumed that the loudspeaker 12 introduces a latency of 90 ms in the audio path. The audio capture module 15 introduces a latency of 80 ms in the audio path. The total audio latency is thus 170 ms.

The television 13 introduces a latency of 70 ms in the video path. The total video latency is thus 70 ms.

The audio latency is thus greater than the video latency.

In the incoming audio/video stream, the audio samples and the video samples are received in advance in order to be decoded. This advance is defined by the time difference between the presentation time stamps of the samples and the reference clock signal. In practice, for the audio, this advance may lie the range 100 ms to 1 second (s). For the video, this advance is smaller because of the necessary buffering.

In the example of FIG. 3, the time difference $\Delta t\_a$ for the audio sample is 200 ms, and the time difference $\Delta t\_v$ for the video sample is 50 ms.

Instead of systematically introducing a positive video decoding delay in the video path in order to compensate for the latency difference between the audio path and the video path, advantage is taken of this advance to force the audio samples to leave the synchronization mechanism earlier so as to make them available more quickly for playback.

The decoding method of the invention thus includes an initial step of evaluating the audio latency introduced by the audio path (in this example equal to 170 ms) and the video latency introduced by the video path (in this example equal to 70 ms).

Figure 4:
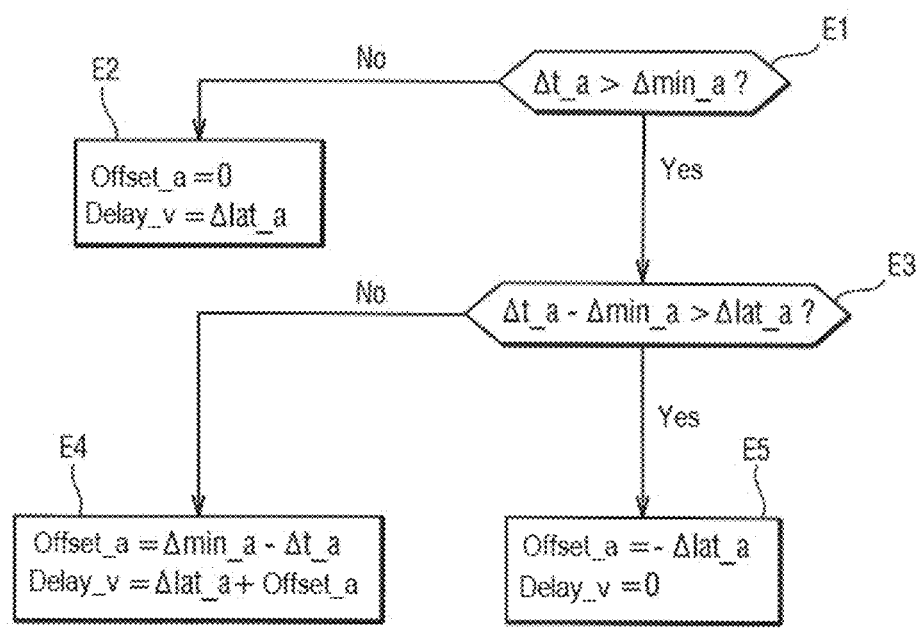
FIG. 4 shows steps of the decoding method of the invention, as performed in the configuration of FIG. 3.

Thereafter, and with reference to FIG. 4, the decoding method comprises a step of testing a first condition in order to ensure that the time difference between the presentation time stamp of the audio samples and the reference clock signal is great enough to enable the audio samples to be decoded correctly (step E1).

The first condition is as follows:

$$\Delta t\_a > \Delta min\_a;$$

where $\Delta t\_a$ is the time difference and $\Delta min\_a$ is a minimum duration for being able to decode the audio correctly.

The value of $\Delta min\_a$ is a constant that is determined depending on the type of codec, on the data rate, etc. It is determined by taking measurements on a set of streams: with its duration being reduced until the audio can no longer be played correctly by the decoder box 11.

If the first condition is not satisfied, the latency difference is compensated in full by adding a positive video decoding delay when the video decoder module 16 performs the video decoding (step E2).

Thus:

$$Delay\_v = \Delta lat\_a;$$

$$Offset\_a = 0;$$

where Delay_v is the positive video decoding delay that is introduced when the video decoder module 16 performs the video decoding, and where $\Delta lat\_a$ is the latency difference (equal to 100 ms in this example).

Offset_a=0 means that no audio offset is applied and that the presentation time stamp of the audio samples is not decreased.

This situation corresponds to the conventional situation, without performing the invention.

If the first condition is satisfied, as in this example, the decoding method includes the step of testing a second condition to evaluate whether the latency difference can or cannot be compensated in full by decreasing the presentation time stamp of the audio samples (step E3).

The second condition is as follows:

$$\Delta t\_a - \Delta min\_a > \Delta lat\_a.$$

If the second condition is not satisfied, the latency difference is compensated both by:

introducing a negative audio offset Offset_a when performing audio decoding, in order to decrease the presentation time stamp of the audio samples, such that:

$$Offset\_a = \Delta min\_a - \Delta t\_a; \text{ and by}$$

adding a positive video decoding delay Delay_v when performing video decoding, such that:

$$Delay\_v = \Delta lat\_a + Offset\_a \quad \text{(step E4)}.$$

In contrast, if the second condition is satisfied, as in this example, the latency difference is compensated in full when performing audio decoding by introducing a negative audio offset Offset_a in order to decrease the presentation time stamp of the audio samples, such that:

$$Offset\_a = -\Delta lat\_a \quad \text{(step E5)}.$$

This situation corresponds to the example of FIG. 3, where the latency difference is compensated in full by a negative audio offset Offset_a equal to −100 ms.

The following also applies:

Delay_v=0, which means that no video decoding delay is introduced in the video path.

Thus, instead of systematically introducing a positive video decoding delay, the decoding method of the invention takes advantage of the time difference PTS−PCR (when it is large enough) to decrease the presentation time stamp of the audio samples and compensate latency by playing them back sooner. The user is no longer subjected to the consequences of the offset, and user experience is improved. In the invention, the synchronization mechanism 17 is used to offset the sending of the samples.

The solution implemented thus consists in making use of the incoming audio/video stream in order to accelerate transfer instead of systematically introducing an offset, as is done in the prior art.

This solution is particularly suited to a system that has an audio path and a video path that are distinct. It is made possible by the fact that the decoding method is performed in the decoder box 11, which receives both the audio stream and the video stream for the purpose of forwarding them to the loudspeaker 12 and to the television 13, and which consequently controls the incoming audio/video stream and can act on it.

Figure 5:
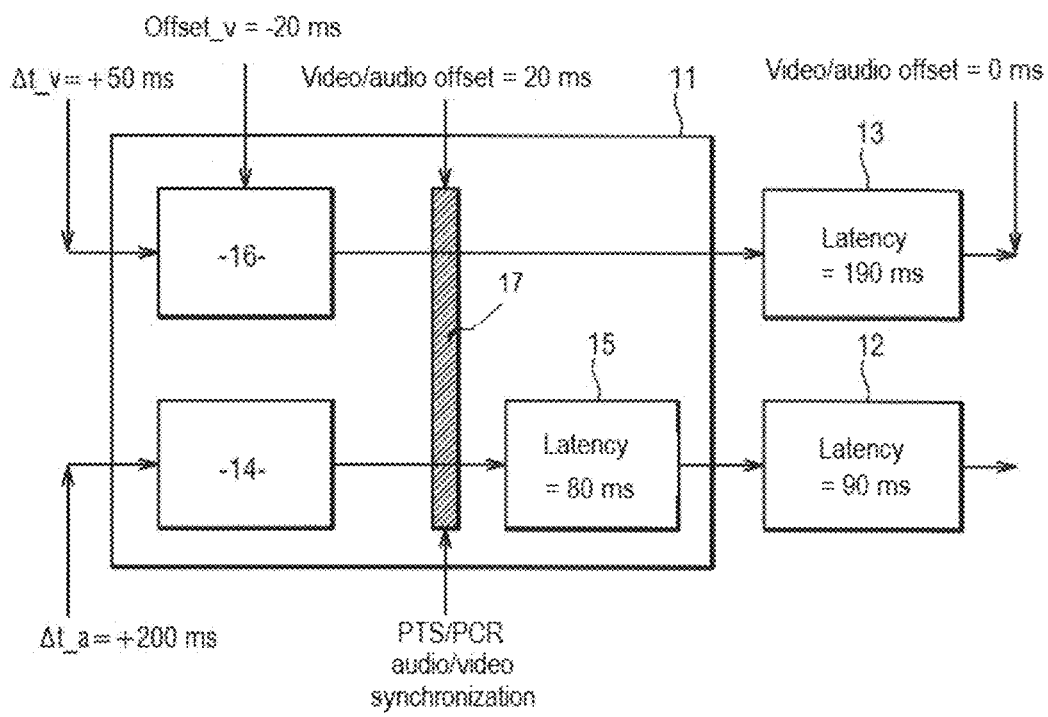
FIG. 5 is a figure similar to FIG. 3, the video latency being greater than the audio latency.

With reference to FIG. 5, the decoding method of the invention is performed once more in the decoder box 11, which is connected to the loudspeaker 12 and to the television 13.

In the example of FIG. 5, it is assumed that the loudspeaker 12 introduces a latency of 90 ms in the audio path. The audio capture module 15 introduces a latency of 80 ms in the audio path. The total audio latency is thus 170 ms.

The television 13 introduces a latency of 190 ms in the video path. The total video latency is thus 190 ms.

The video latency is thus greater than the audio latency.

In the incoming audio/video stream, the audio samples and the video samples are received in advance in order to be decoded. This advance is defined by the time difference between the presentation time stamps of the samples and the reference clock signal.

In the example of FIG. 5, the time difference Δt_a for the audio sample is +200 ms, and the time difference Δt_v for the video sample is +50 ms.

Instead of systematically introducing a positive audio decoding delay in the audio path in order to compensate for the latency difference between the audio path and the video path, advantage is taken of this advance to force the video samples to leave the synchronization mechanism earlier so as to make them available more quickly for playback.

The decoding method of the invention thus includes an initial step of evaluating the audio latency introduced by the audio path (in this example equal to 170 ms) and the video latency introduced by the video path (in this example equal to 190 ms).

Figure 6:
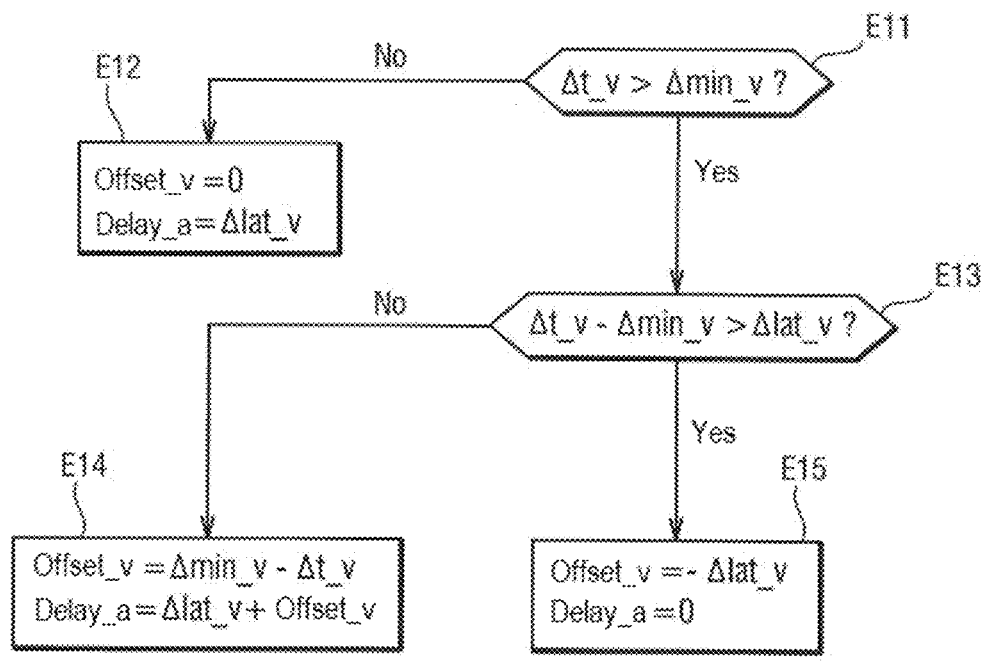
FIG. 6 shows steps of the decoding method of the invention, as performed in the configuration of FIG. 5.

Thereafter, and with reference to FIG. 6, the decoding method comprises the step of testing a first condition in order to ensure that the time difference between the presentation time stamp of the video samples and the reference clock signal is great enough to enable the video samples to be decoded correctly (step E11).

The first condition is as follows:

$\Delta t\_v > \Delta min\_v$, where $\Delta t\_v$ is the time difference and $\Delta min\_v$ is a minimum duration for being able to decode the video correctly.

The value of $\Delta min\_v$ is a constant that is determined depending on the type of codec, on the data rate, etc. It is determined by taking measurements on a set of streams: with its duration being reduced until the video can no longer be played correctly by the decoder box 11.

If the first condition is not satisfied, the latency difference is compensated in full by adding a positive audio decoding delay when the audio decoder module 14 performs the audio decoding (step E12).

Thus:

$$Delay\_a = \Delta lat\_v;$$

$$Offset\_v = 0;$$

where Delay_a is the positive audio decoding delay that is introduced when the audio decoder module 14 performs the audio decoding, and where Δlat_v is the latency difference (equal to 20 ms in this example).

Offset_v=0 means that no video offset is applied and that the presentation time stamp of the video samples is not decreased.

This situation corresponds to the conventional situation, without performing the invention.

If the first condition is satisfied, as in this example, the decoding method includes the step of testing a second condition to evaluate whether the latency difference can or cannot be compensated in full by decreasing the presentation time stamp of the video samples (step E13).

The second condition is as follows:

$$\Delta t\_v - \Delta min\_v > \Delta lat\_v.$$

If the second condition is not satisfied, the latency difference is compensated both by:

introducing a negative video offset Offset_v when performing video decoding, in order to decrease the presentation time stamp of the video samples, such that:

$$Offset\_v = \Delta min\_v - \Delta t\_v; \text{ and by}$$

adding a positive audio decoding delay Delay_a when performing the audio decoding, such that:

$$Delay\_a = \Delta lat\_v + Offset\_v \quad \text{(step E14)}.$$

In contrast, if the second condition is satisfied, as in this example, the latency difference is compensated in full when performing video decoding by introducing a negative video offset Offset_v in order to decrease the presentation time stamp of the video samples, such that:

$$Offset\_v = -\Delta lat\_v \quad \text{(step E15)}.$$

This situation corresponds to the example of FIG. 5, where the latency difference is compensated in full by a negative video offset Offset_v equal to −20 ms.

The following also applies:

Delay_a=0, which means that no audio decoding delay is introduced in the audio path.

Naturally, the invention is not limited to the embodiment described, but covers any variant coming within the ambit of the invention as defined by the claims.

In particular, the playback equipment connected to the decoder box need not necessarily comprise a loudspeaker and a television.

The invention claimed is:

1. A decoding method for decoding an incoming audio/video stream received by a decoder box that is connected to audio playback equipment and to video playback equipment, the incoming audio/video stream transporting a reference clock signal and comprising audio samples and video samples including respective presentation time stamps, the decoding method comprising the steps of:
   - evaluating an audio latency introduced by an audio path and a video latency introduced by a video path;
   - if the audio latency is greater than the video latency, or if the video latency is greater than the audio latency, testing a first condition to ensure that a time difference between the presentation time stamp of the audio (or respectively video) samples and the reference clock signal is sufficient to enable the audio (or respectively video) samples to be decoded correctly; and
   - if the first condition is satisfied, acting, when decoding the audio (or respectively video), to decrease the presentation time stamp of the audio (or respectively video) samples by introducing an offset in order to advance playback of the audio (or respectively video) samples, thereby compensating at least in part a latency difference between the audio (or respectively video) latency and the video (or respectively audio) latency.

2. The decoding method according to claim 1, wherein the first condition is as follows:

$$\Delta t > \Delta min,$$

where $\Delta t$ is the time difference and $\Delta min$ is a minimum duration for enabling the audio (or respectively video) to be decoded correctly.

3. The decoding method according to claim 2, wherein, if the first condition is not satisfied, the latency difference is compensated in full by adding a positive video (or respectively audio) decoding delay when performing the video (or respectively audio) decoding.

4. The decoding method according to claim 2, wherein, if the first condition is satisfied, the decoding method includes the step of testing a second condition to evaluate whether the latency difference can or cannot be compensated in full by decreasing the presentation time stamp of the audio (or respectively video) samples.

5. The decoding method according to claim 4, wherein the second condition is as follows:

$$\Delta t - \Delta min > \Delta lat,$$

where $\Delta lat$ is the latency difference.

6. The decoding method according to claim 4, wherein, if the second condition is not satisfied, the latency difference is compensated:
   - by introducing a negative audio (or respectively video) offset when performing audio (or respectively video) decoding, in order to decrease the presentation time stamp of the audio (or respectively video) samples, such that:

$$\text{Offset} = \Delta min - \Delta t;$$

- by adding a positive video (or respectively audio) decoding delay when performing video (or respectively audio) decoding, such that:

$$\text{Delay} = \Delta lat + \text{Offset}.$$

7. The decoding method according to claim 4, wherein, if the second condition is satisfied, the latency difference is compensated in full by introducing a negative audio (or respectively video) offset when performing the audio (or respectively video) decoding in order to decrease the presentation time stamp of the audio (or respectively video) samples, such that:

$$\text{Offset} = -\Delta lat.$$

8. A decoder box including an audio decoder module and a video decoder module, the decoding method according to claim 1 being performed in the decoder box.

9. A non-transitory computer-readable storage medium storing a computer program including instructions for causing a decoder box to execute the steps of the decoding method according to claim 1.

* * * * *